Patented May 29, 1951

2,554,986

UNITED STATES PATENT OFFICE 2,554,986

SYNTHESIS OF PREGNENOLONE

Frederick W. Heyl and Milton E. Herr, Kalamazoo, Mich., assignors to The Upjohn Company, Kalamazoo, Mich., a corporation of Michigan No Drawing. Application January 5, 1950,
Serial No. 137,037

15 Claims. (Cl. 260—397.4)

The present invention relates to a novel synthesis of pregnenolone and to certain key intermediates of importance in the said synthesis. The invention more particularly relates to the synthesis of pregnenolone from a 3-acyloxy-bisnor-5-cholen-22-al by a series of reactions including enol-esterification, ozonolysis, decomposition of the ozonide, and hydrolysis.

Pregnenolone, a compound which is easily converted to progesterone by the Oppenauer oxidation technique, is an important steroid intermediate. Many processes for the preparation of this compound from materials which are readily available are known in the art, but these processes all involve the use of from 7 to 10 process steps from the starting material to the final product, pregnenolone. For example, the usual synthesis of pregnenolone (Butenandt, U. S. Patents 2,232,438 and 2,313,732) requires 9 synthesis steps, and the newly-developed process of Ruschig [Fieser and Fieser, Natural Products Related to Phenanthrene, Third Edition, page 387, Reinhold Publishing Corporation, 1949 (C. R. Addinall, Field Information Technical Report No. 996)] requires 8 steps, the multiplicity and complexity of the procedure resulting in a relatively low yield. When it is considered that one of the most desirable starting materials, a phytosterol mixture from soybean oil, contains up to 18 percent of material suitable for conversion to starting materials, any reduction of the yield of pregnenolone is represented by a large increase in the amount of starting phytosterol mixture required to produce an equivalent amount of pregnenolone or progesterone.

It is, therefore, an important object of the present invention to provide an economically superior method for the synthesis of pregnenolone. Another object is the provision of such process which proceeds from a 3-acyloxy-bisnor-5-cholene-22-al through the steps of enol-esterification, ozonolysis and decomposition of the resulting ozonide to produce an ester of pregnenolone, which can be readily hydrolyzed to pregnenolone in the usual manner. Still a further object of the present invention is the provision of a novel group of 3,22-diacyloxy-bisnor-5,20(22)-choladienes. Other objects will become apparent hereinafter.

The series of reactions comprising the method of the present invention is outlined schematically in the following illustrative diagram:

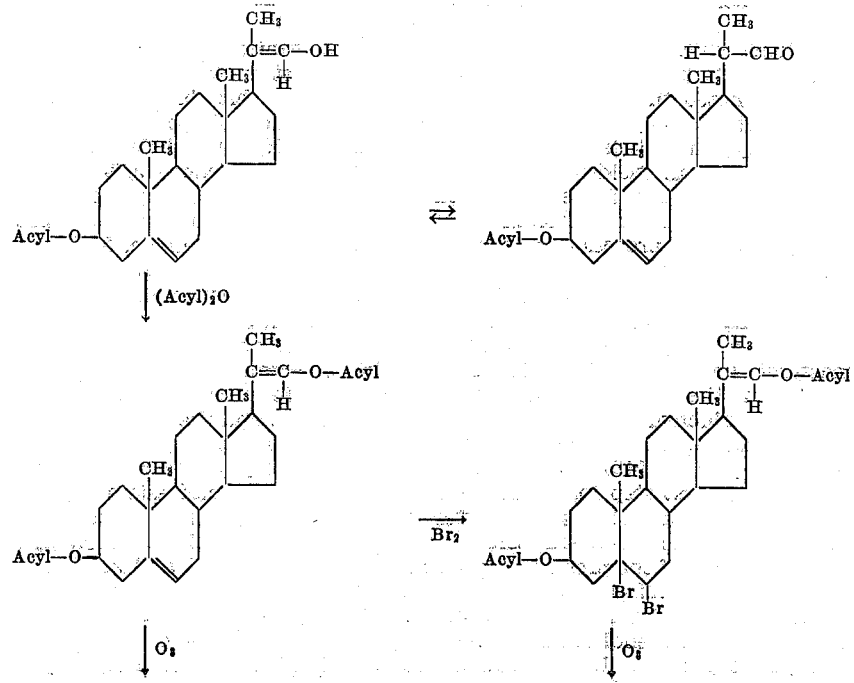

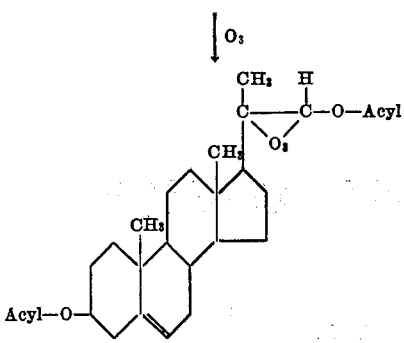 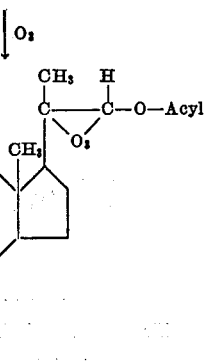

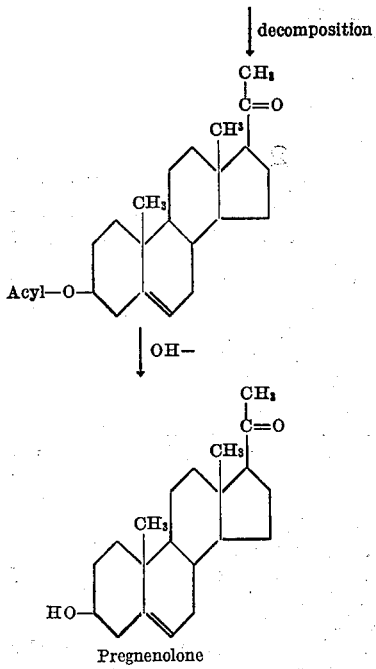

Pregnenolone

As indicated in the foregoing diagram, pregnenolone can be obtained by means of a relatively simple synthesis involving enol-esterification of a 3-acyloxy-bisnor-5-cholen-22-al to produce an enol ester thereof, ozonolysis of the 20:22 double bond thus formed, decomposition of the 20:22 ozonide, and separation of an ester of pregnenolone, which can be hydrolyzed in quantotative yields to pregnenolone.

It is to be noted that such a process involves only four synthesis steps in contrast to prior art processes requiring at least 8 steps. Such a technique results in yields of pregnenolone of consistently better than 50 percent based on the starting 3-ester of bisnor-5-cholene-22-al. This, of course, provides a process more desirable from an economic standpoint.

The 3 - acyloxy - bisnor - 5 - cholen - 22 - als, used as starting compounds for the process of this invention, can be prepared from an ester of stigmasterol by selective ozonization of the 22-23 bond in the presence of a tertiary amine to form an aldehyde as described by Heyl, Centolella, and Herr, J. Am. Chem. Soc. 69, 1957, (1947) and 70, 2953 (1948).

Step A.—The first step in the method of this invention is the formation of an enol ester of a 3-acyloxy-bisnor-5-cholene-22-al. Since the next step in the method of the present invention is the oxidation of the 20:22-double bond formed by enolization of the 22-aldehyde, it is of critical importance that the enol form of the 22-aldehyde group be present. Under ordinary conditions, the 22-aldehyde group exists in its enolic form to only a slight extent, with the tautomeric aldehyde form predominating. However, it is possible to convert the aldehyde completely into its enol form by forming a stable enolic ester derivative thereof. The use of a carboxylic acid anhydride in the presence of an alkali-metal salt of the corresponding carboxylic acid is the preferred esterification procedure, although other methods known to the art, such as esterification by the use of an acid halide, e. g., acetyl chloride or benzoyl chloride, or a ketene in the presence of an acid catalyst can also be used. Conditions for the formation of such esters are usually a temperature between about sixty and about 150 degrees centigrade, preferably at the reflux temperature of the reaction mixture, but always below the decomposition temperature of the reactants or reaction product.

Representative esters of the 22-enolic hydroxyl group, or both the 3 and 22-hydroxyl groups include the formic, acetic, propionic, butyric, valeric, isovaleric, hexanoic, heptanoic, octanoic, cyclohexanoic, benzoic, toluic and naphthoic acid esters; the half esters of succinic, glutaric, adipic, and other dibasic acids such as phthalic and maleic; and, substituted acids such as methoxy acetic, chlorobutyric and the like. Since the acid radicals are subsequently removed in both the 3 and 22-positions, any acid residue which will stabilize the 22-aldehyde in its enolic form is satisfactory for the purposes of this invention. It is to be understood that mixed esters are entirely satisfactory for the purposes of this invention. Representative esters include: 3 - benzoyloxy - 22 - acetoxy - bisnor - 5,20(22) - choladiene, 3 -valeroyloxy - 22 - acetoxy - bisnor - 5,20(22) - choladiene, 3 - acetoxy- 22 - heptoyloxy - bisnor - 5,20(22) - choladiene, 3 - butyroyloxy - 22 - benzoyloxy - bisnor - 5,20 (22)-choladiene, 3 - butyroyloxy- 22 -formyloxy - bisnor - 5,20(22) -choladiene, et cetera. A consideration of the carbon atom in the 3-position will ascertain that it is asymmetric. Therefore, 2 forms of each diester, determined by the spatial arrangement of the substituents, are possible. However, since the 3-ester group is hydrolyzed off, and the hydroxy group subsequently oxidized, it will be apparent that both forms are operative and included within the scope of this invention.

The enol esters thus obtained are crystalline solids soluble in methanol, ethanol, chloroform, and the like; moderately soluble in a mixture of acetic acid and acetic anhydride, acetone, ether and the like; and insoluble in water and the paraffin hydrocarbon solvents.

Since the enol esters can be considered as substituted ethylenes, they are capable of existing in both cis and trans forms. Due to the difficulty of obtaining both forms in a highly purified state a preferred modification of this invention contemplates the use of said enol esters in the following step without separation and purification of the isomers.

*Step B.*—The next step in the method of this invention is the addition of one molar equivalent of ozone to the 20:22 double bond of a 3-acyloxy - 22-acyloxy-bisnor-5,20(22)-choladiene, without at the same time adding ozone to the 5:6 double bond. This can be conveniently accomplished by passing ozone into a solution of a 3 - acyloxy - 22 - acyloxy - bisnor - 5,20(22) - choladiene at a temperature below about thirty degrees centigrade, preferably from minus thirty to plus ten degrees centigrade, according to known methods of ozonization, until one molecular proportion of ozone has been added. The introduction into the reaction mixture of appreciably more ozone than necessary to form a monoozonide results in a lowering of the yield of the desired ozonide due to undesirable secondary reactions brought about by the excess ozone.

Some of the common solvents used in ozonization, for example, chloroform, destroy a part of the ozone so that a determination of the total quantity of ozone to be introduced into the reaction mixture must make allowance for this loss to the solvent. The total quantity of ozone preferably introduced into the reaction mixture is from 1.0 to 1.5 molecules of ozone per molecule of enol ester, over and above any which may be lost to the solvent, or from 1.25 to 2.0 moles of ozone per mole of enol ester, including the amount to be lost to the solvent, the exact quantity which will be lost to the solvent being, of course, dependent upon the particular solvent used. The action of ozone on some ozonization solvents, such as chloroform, also causes formation of acidic material during the ozonization, and, in such cases, the addition of a small quantity of a tertiary amine, such as a pyridine, trimethylamine, triethylamine, tri-(n-propyl)-amine, picoline, or the like, as an acid-binding agent, into the ozonization reaction mixture is a preferred manner of operation. The amount of amine added should be from 0.1 to 2.0 percent, or more, and at least sufficient so that the solution does not give an acid test upon completion of the ozonization.

Representative solvents useful for the ozonization include chloroform, carbon tetrachloride, mixtures of ether and chloroform, methylene chloride, glacial acetic acid, methanol and ethyl acetate.

Alternatively, if desired, the 5,6-double bond can be protected by the addition of a halogen thereto, preferably bromine, prior to the introduction of ozone, thus preventing any oxidation of the 5,6-double bond, which occurs to some extent even under optimum conditions. Other methods of protecting the 5,6-double bond may also be used, if desired, such as the formation of an i-ester, i-ether, et cetera.

The mono-ozonide, if desired, may be isolated prior to the decomposition step, in a manner known to the art, but a preferred form of the invention contemplates the more usual procedure of reductive decomposition of a solution of the ozonide without isolation thereof. The reductive decomposition of the ozonide can be carried out according to known procedure.

*Step C.*—The next step in the method of this invention is the decomposition of the ozonide and, if the 5,6-double bond is protected, treatment to reintroduce the 5,6-double bond. This can be accomplished by decomposing the ozonide by any of the usual procedures, as by steam distillation, or, adding the ozonide to boiling acetic or propionic anhydride, to liquid ammonia, to a concentrated aqueous solution of potassium bisulfite, to a dilute solution of sodium bisulfite, to a mixture of powdered zinc and water, or to a mixture of powdered zinc and glacial acetic acid, reductive decomposition with zinc and acetic acid being preferred. If the 5,6-bond is protected with halogen atoms it can be dehalogenated with simultaneous decomposition of the ozonide or the two reactions can be accomplished stepwise, the halogen being removed by any of the methods known in the art. The two reactions can be accomplished in either order, if desired.

As is conventional with ozonizations, when conducted in solvents other than glacial acetic acid, the solvent used for the ozonization can be replaced by glacial acetic acid after completion of the ozonization by adding glacial acetic acid to the ozonide solution and removing the lower boiling solvent by fractional distillation under reduced pressure, with introduction of additional acetic acid, if necessary. Or, if desired, the ozonide can be isolated as previously mentioned and then dissolved in glacial acetic acid. However, we do not limit ourselves to glacial acetic acid as the solvent for the decomposition of the ozonide, the usual solvents also being suitable.

By "reductive decomposition" is meant decomposition in such a manner that the excess oxygen formed by decomposition of the ozonide is prevented from forming hydrogen peroxide by combining with any moisture present, and that molecular oxygen is prevented from oxidizing the pregnenolone ester thus-formed. The addition of a small quantity of alcoholic silver nitrate, from which molecular silver is formed during the decomposition, aids in the rapid decomposition of any hydrogen peroxide which may form. Other finely-divided metals, such as silver, magnesium, platinum, or non-oxidizing ozonide decomposing agents known in the art, may also be employed. The use of "reductive conditions" in the decomposition of ozonides, is well known in the art; see, for example, Hill and Kelly, "Organic Chemistry," page 53, The Blakiston Co., Philadelphia (1934); Gilman, "Organic Chemistry," page 636, 2nd ed., John Wiley and Sons, New York (1943); Church et al., J. Am. Chem. Soc. 56, 176–184 (1934); and Long, Chem. Reviews 27, 452–454 (1940).

The esters of pregnenolone thus produced can be isolated, if the zinc and acetic acid process is used, by filtering off the zinc and diluting the acetic acid solution with water. Or preferably, after filtering off the zinc, the acetic acid solution is diluted with several volumes of ether, washed with water, dilute sodium carbonate solution, dried, and the solvent removed. A further modification contemplates the isolation of the esters of pregnenolone by way of their highly crystalline semicarbazones. This can be accomplished by refluxing a methanol solution of an ester of pregnenolone, e. g., that obtained by dilution of the acetic acid as previously described, with semicarbazide hydrochloride. Pregnenolone can be readily obtained by refluxing the semicarbazone of a pregnenolone-3-ester in a solution of ethanol, water and sulfuric acid, and recovered by diluting the mixture with water and extracting with ether. The ether solution is then washed, dried and the solvent removed to obtain pure pregnenolone. However, it is to be understood that other methods of separating aldehydes, which will be apparent to those skilled in the art, such as through the use of a hydrazine, or a substituted hydrazine can also be used to recover pregnenolone.

Pregnenolone may be used as a therapeutic agent per se, or may preferably be converted to progesterone by the Oppenauer oxidation or other oxidation procedures known to the art.

The following examples are given by way of illustration only and are not to be construed as limiting.

*Preparation.—3-acetoxy-bisnor-5-cholen-22 - al*

A solution of 5,6-dibromo-stigmasterol acetate (obtained from 9.08 grams of stigmasterol acetate by bromination) in 450 milliliters of chloroform containing 7.5 milliliters of pyridine was cooled to zero degrees centigrade and 1.4 molar equivalents of ozone added at the rate of about 20 milligrams per minute. The chloroform was then removed under reduced pressure keeping the temperature below thirty degrees centigrade, the ozonide dissolved in glacial acetic acid, and powdered zinc added thereto. Ether was added, the zinc filtered off, and most of the acetic acid removed by washing thoroughly with water. 3-acetoxy-bisnor-5-cholenic acid, formed as a by-product, was removed as its insoluble sodium salt and other acidic by-products were removed with aqueous sodium hydroxide. The ether solution was dried, the solvent removed by distillation and unreacted stigmasterol acetate separated by crystallization from a minimum amount of alcohol. The alcohol was removed by distillation and the residue extracted with boiling hexane. Upon evaporation of the hexane solution, there was obtained 4.6 grams of 3-acetoxy-bisnor-5-cholen-2-al, melting at 80 to 100 degrees centigrade. The crude aldehyde thus obtained was then dissolved in twenty-five milliliters of methanol and shaken vigorously with 200 milliliters of saturated sodium bisulfite solution whereupon the solid aldehyde-bisulfite addition product separated. The mixture was then shaken three times with fifty-milliliter portions of ether, the organic extracts discarded; and the solid bisulfite compound collected by filtration, dried, added to a mixture of 100 milliliters of ether and fifty milliliters of ten percent sodium carbonate solution, and nitrogen bubbled through the mixture until all of the addition compound was decomposed, the liberated aldehyde dissolving in the ether. The organic layer was then separated, washed with an equal volume of water, dried, and the solvent removed by distillation to obtain pure 3-acetoxy-bisnor-5-cholen-22-al, melting at 116 to 117 degrees centigrade.

In a manner essentially as described, the following esters can be prepared:

(a) 3-butyroyloxy-bisnor-5-cholen-22-al from stigmasterol butyrate, (b) 3-formyloxy-bisnor-5-cholen-22 - al from stigmasterol formate, (c) 3 - heptoyloxy-bisnor-5-cholen-22-al from stigmasterol heptoate, and (d) 3-benzoyloxy-bisnor-5-cholen-22-al from stigmasterol benzoate.

*Example 1.—3-22-diacetoxy-bisnor-5,20(22) - choladiene*

A mixture of 1.57 parts of 3-acetoxy-bisnor-5-cholen-22-al, one part anhydrous sodium acetate and 54 parts of acetic anhydride under a nitrogen atmosphere was heated at reflux temperature for six hours, the excess acetic anhydride and acetic acid removed by distillation under reduced pressure, and the residue extracted with fifty parts of boiling actone. Upon concentration to about 5 parts and cooling, the acetone extract deposited 0.63 part of 3,22-diacetoxy-bisnor-5,20(22)-choladiene, melting at 154 degrees centigrade. Upon concentration of the filtrate and addition of water, an additional 0.61 part of 3,22-diacetoxy-bisnor-5,20(22)-choladiene was obtained which melted at 143 to 146 degrees centigrade.

Analysis:
Calculated for $C_{26}H_{38}O_4$: C, 75.3; H, 9.24
Found: 75.5   9.01

*Example 2.—Pregnenolone acetate*

To a solution of 63 parts of 3,22-diacetoxy-bisnor-5,20(22)-choladiene in 5600 parts of chloroform, cooled to five degrees centigrade, was added, at a uniform rate over a period of fifteen minutes, a solution of 24.3 parts of bromine in 700 parts of chloroform. After the color of bromine had disappeared, 13.9 parts of ozone were passed into the solution. The chloroform was carefully removed under reduced pressure sufficient that the temperature was maintained below ninety degrees centigrade and the residue dissolved in a mixture of 400 parts of glacial acetic acid and 800 parts of diethyl ether. This solution was then agitated vigorously with 63 parts of zinc dust for about five minutes to decompose the ozonide and remove the 5,6-bromine atoms, 700 parts of diethyl ether added, and the zinc removed by filtration. The filtrate was washed three times with equal volumes of water, cold ten percent sodium hydroxide solution, water, dried, and the solvent removed by distillation. The residue was dissolved in a mixture containing 400 parts of methanol, 5 parts semicarbazide hydrochloride, 5 parts sodium acetate, and 45 parts water. After heating at reflux temperature for one hour and cooling, 37.6 parts of analytically pure pregeneneolone-acetate semicarbazone, melting at 240–242 degrees centigrade, was obtained.

*Example 3.—Pregnenolone-acetate without isolation of the enol acetate*

One part of 3-acetoxy-bisnor-5-chlolene-22-al was converted into its enol ester with 100 parts of acetic anhydride and 1.7 parts of anhydrous sodium acetate essentially as described in Example 1. After removing the excess acetic anhydride and acetic acid by distillation under reduced pressure, the residue was agitated with 100 parts of dry chloroform, and filtered to remove the sodium acetate. The chloroform solution was then cooled to between zero and minus ten degrees centigrade and about 0.15 part of ozone added at the rate of 9.6 milligrams per minute. The chloroform was removed under reduced pressure at a temperature below ninety degrees centigrade, and the ozonide dissolved in a mixture of five parts of glacial acetic acid and ten parts of diethyl ether. This solution was agitated with one part of zinc dust for five minutes to decompose the ozonide, 75 parts of ether added, and the zinc removed by filtration. The filtrate was washed three times with equal volumes of water, cold ten percent sodium hydroxide solution, water, dried, and the solvent removed. The crystalline residue was then dissolved in methanol and allowed to react with semicarbazide hydrochloride essentially as described in Example 2. There was thus obtained 0.54 part of the semicarbazone of pregnenolone acetate, melting at 235 degrees centigrade.

In a manner essentially as described in Example 3, the following diesters can be prepared and converted into 3-esters of pregnenolone:

(a) 3 - formyl - 22 - acetoxy-bisnor - 5,20(22) - choladiene from 3-formyl-bisnor-5-cholen-22-al and acetic anhydride, (b) 3 - formyl - 22 - proprionyloxy - bisnor-5,20(22) - choladiene from 3 - formyl-bisnor - 5-cholen-22-al and propionic anhydride, (c) 3 - acetoxy - 22 - chloroacetoxy - bisnor-5,20(22)-choladiene from 3-acetoxy-bisnor-5-cholen-22-al and chloroacetyl chloride, (d) 3,22 - dibenzoyloxy - bisnor - 5,20(22)-choladiene from 3-benzoyloxy-bisnor-5-cholen-22-al and benzoic anhydride, and (e) 3 - benzoyloxy - 22 - acetoxy - bisnor-5,20(22)-choladiene from 3-benzoyloxy-bisnor-5-cholen-22-al and acetic anhydride.

Inasmuch as the foregoing specification comprises preferred embodiments of the invention, it is to be understood that variations and modifications may be made therein and that the invention is not to be restricted except as limited by the appended claims.

We claim:

1. The process which includes: forming a 22-enol ester by heating a 3-acyloxy-bisnor-5-cholen-22-al with an enol esterifying agent at a temperature between about 60 and about 150 degrees centigrade.

2. The process which includes: forming a 22-enol ester by heating a 3-acyloxy-bisnor-5-cholen-22-al with an enol esterifying agent at a temperature between about 60 and about 150 degrees centigrade; ozonizing the 20:22 double bond of a steroid molecule having an enol ester grouping in the 22-position with ozone at a temperature below about 30 degrees centigrade until the 20:22 ozonide thereof is formed.

3. The process which includes: forming a 22-enol ester by heating a 3-acyloxy-bisnor-5-cholen-22-al with an enol esterifying agent at a temperature between about 60 and about 150 degrees centigrade; ozonizing the 20:22 double bond of a steroid molecule having an enol ester groupinng in the 22-position with ozone at a temperature below about 30 degrees centigrade until the 20:22 ozonide thereof is formed; and, decomposing the ozonide with a decomposition reagent to form a 20-keto steroid compound.

4. The process which includes: forming a 22-enol ester by heating a 3-acyloxy-bisnor-5-cholene-22-al with acetic anhydride and an alkali metal salt of acetic acid at a temperature between about 60 and 150 degrees centigrade; and forming a 20:22 ozonide of a 22-enol ester by treating with ozone at a temperature below about 30 degrees centigrade.

5. The process which includes: forming a 22-enol ester by heating a 3-acyloxy-5-cholene-22-al with acetic anhydride and an alkali metal salt of acetic acid at a temperature between about 60 and 150 degrees centigrade; and forming a 20:22 ozonide of a 22-enol ester by treating with ozone at a temperature below about 30 degrees centigrade; and, decomposing the 20:22 ozonide to form a steroid molecule containing a 20-keto grouping.

6. In a method of synthesizing pregnenolone, the steps which include: (a) forming an enol ester by heating a 3-acyloxy-bisnor-5-cholene-22-al with a carboxylic acid anhydride in the presence of an alkali metal salt of the corresponding acid; (b) treating, at a temperature below about 30 degrees centigrade, the product thus-obtained with that amount of ozone required to form a 20:22 ozonide thereof; (c) decomposing the thus-obtained ozonide with a metal and acetic acid; and (d) recovering an ester of pregnenolone from the mixture.

7. In a process for synthesizing pregnenolone, the steps which include: (a) mixing a 3-acyloxy-bisnor-5-cholene-22-al with a carboxylic acid anhydride and an alkali metal salt of the acid of said anhydride at a temperature between 60 and 150 degrees centigrade until the starting aldehyde has been converted to an enol ester of the carboxylic acid anhydride; (b) ozonizing the thus-obtained enol ester with ozone at a temperature below about 30 degrees centigrade; (c) reductively decomposing the resulting 20:22-ozonide with a metal and acetic acid; and (d) recovering the resulting pregnenolone ester from the reaction mixture.

8. The process of claim 7, wherein the starting aldehyde is a 3-acetoxy-bisnor-5-cholene-22-al.

9. The process of claim 7, wherein the enol esterification is conducted at about the reflux temperature of the reaction mixture.

10. The process of claim 7, wherein the carboxylic acid anhydride is acetic anhydride and wherein the alkali metal salt is sodium acetate.

11. The process of claim 7, wherein the ozonization is conducted between $-30$ and 10 degrees centigrade.

12. The process of claim 7, wherein the pregnenolone ester is recovered as a semi-carbazone.

13. A 3,22 - diacyloxy-bisnor-5,20(22) - choladiene the acyl radicals of which are those of unsubstituted organic monocarboxylic acids having from 1 to 7 carbon atoms, inclusive, in the molecule.

14. A 3,22 - diacetoxy-bisnor-5,20(22) -choladiene.

15. In a process for preparing pregnenolone, the steps which include: treating 3-acetoxy-bisnor-5-cholene-22-al with acetic anhydride in the presence of sodium acetate; treating 3,22-diacetoxy-bisnor-5,20(22)-choladiene with ozone at a temperature between about $-30$ and about 10 degrees centigrade; treating the thus-obtained 20:22-ozonide with zinc and acetic acid to form a 3-acetoxy-pregnenolone; separating from the reaction mixture the 3-acetoxy-pregnenolone by forming with semicarbazide the corresponding semicarbazone; and, hydrolyzing with aqueous sulfuric acid, the semicarbazone to prepare free pregnenolone.

FREDERICK W. HEYL.
MILTON E. HERR.

No references cited.